United States Patent [19]
Brewer

[11] Patent Number: 6,112,700
[45] Date of Patent: Sep. 5, 2000

[54] REPTILE CAGE AND PROCESS FOR HOUSING REPTILES IN CAPTIVITY

[76] Inventor: Jay Brewer, 18822 Brookhurst St., Fountain Valley, Calif. 92708

[21] Appl. No.: 09/080,395

[22] Filed: May 18, 1998

[51] Int. Cl.$^7$ .............................. A01K 1/00; A01K 63/00
[52] U.S. Cl. ......................... 119/452; 119/246; 119/248; 119/482; 119/484
[58] Field of Search ..................................... 119/452, 480, 119/482, 484, 246, 248, 453, 459, 463

[56] References Cited

U.S. PATENT DOCUMENTS

| | | | |
|---|---|---|---|
| 3,791,347 | 2/1974 | Lovell | 119/497 |
| 3,861,356 | 1/1975 | Kulka | 119/482 |
| 4,844,916 | 7/1989 | Filosa | 119/481 |
| 5,081,956 | 1/1992 | Greitzer et al. | 119/500 |
| 5,231,789 | 8/1993 | Radmanovich | 43/57 |
| 5,265,558 | 11/1993 | Schonrock | 119/28.5 |
| 5,380,022 | 1/1995 | Dennis | 280/47.35 |
| 5,465,988 | 11/1995 | Dennis | 280/47.35 |
| 5,713,304 | 2/1998 | Vosjoli et al. | 119/266 |
| 5,826,541 | 10/1998 | Wilkins | 119/57.8 |

*Primary Examiner*—Peter M. Poon
*Assistant Examiner*—Yvonne R. Abbott
*Attorney, Agent, or Firm*—Edgar W. Averill, Jr.

[57] ABSTRACT

A reptile cage and a process for comfortably housing reptiles. The cage is fabricated from a polymeric foam and preferably has the shape of a hollow rectangular solid having one side open and the other sides formed from a polymeric foam. The cage preferably has a smooth plastic inner liner. The cage is preferably closed by sliding transparent door and has a screen vent along a portion of the front.

4 Claims, 1 Drawing Sheet

REPTILE CAGE AND PROCESS FOR HOUSING REPTILES IN CAPTIVITY

BACKGROUND OF THE INVENTION

The field of the invention is cages and the invention relates more particularly to cages for cold blooded creatures such as reptiles, amphibians, tortoises and arachnids. A problem with maintaining such cold blooded creatures in captivity is that they are typically maintained in a room which is not open to the sunlight. While such snakes and the like are capable of staying alive at low temperatures, they become very lethargic and for such businesses as a pet store, it is preferable that the snakes and other cold blooded creatures be alert while they are maintained in a cage.

While animal enclosures have commonly been made of plastics, such as that shown in U.S. Pat. No. 4,201,153, it is not believed that cages have been fabricated from an insulative material and more particularly, from a foamed polymeric material. By essentially eliminating the loss of heat through the walls of the cage, a small light bulb is capable of maintaining a reptile cage at a temperature comfortable for the reptile even if the surrounding temperature is below that of a comfortable level.

BRIEF SUMMARY OF THE INVENTION

It is an object of the present invention to provide a cage for reptiles and other cold blooded creatures which is fabricated from a highly insulative polymeric foam.

The present invention is for a cage for reptiles and the like having at least three side walls and a bottom fabricated from a polymeric foam, preferably STYROFOAM™. The wall thickness should be between about 1" and 3". It is preferably a hollow rectangular block with five of its six surfaces made of a polymeric foam. It is also preferably lined with a thin solid polymeric sheet to facilitate cleaning and also preferably has a sliding transparent window and a vent covering the sixth surface.

The present invention is also for a process for comfortably housing reptiles comprising placing the reptiles in a container having a bottom, two sides, a back, and a top made from a polymeric foam having a thickness of between 1" and 3" and closing a front with a cover that is at least partially air permeable.

DESCRIPTION OF THE PREFERRED EMBODIMENTS

Figure 1:
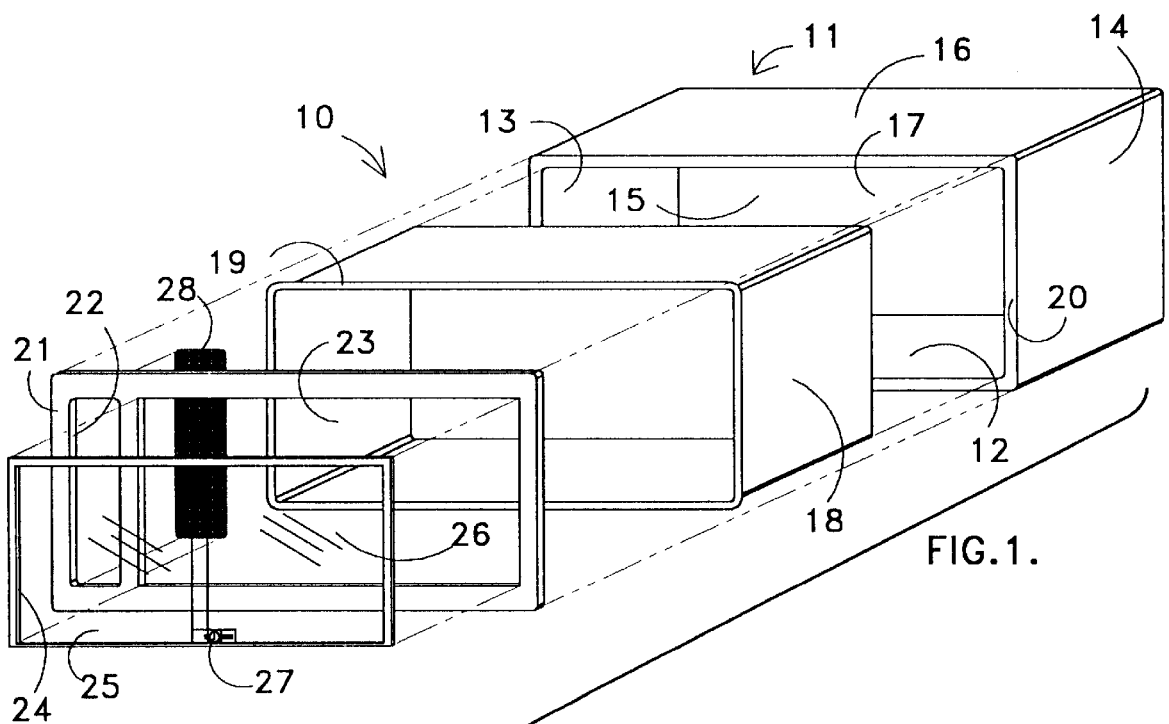
FIG. 1 is an exploded perspective view of the reptile cage of the present invention.

The cage of the present invention is shown in an exploded perspective view in FIG. 1 and indicated generally by reference character 10. Cage 10 has a polymeric foamed enclosure 11 which has a bottom 12, sides 13 and 14, a back 15, a top 16, and an open front 17. A thin, perferably vacuum formed, plastic shell 18 fits tightly within the interior of enclosure 11. The shell has a flange 19 which covers the face 20 of the enclosure 11. Next, a front frame 21 is adhered to flange 19. Frame 21 has two openings. One of these openings is a screen opening 22 and the other is a door opening 23. A glass door has a frame 24 which is secured to door opening 23 and has two sliding glass doors 25 and 26. It preferably has a lock 27, and a wire or polymeric screen member 28 is secured over the screen opening 22 to provide a source of air for the caged reptile or other creature. The cage is especially useful for reptiles. It is also useful for amphibians, tortoises and arachnids. The inner surface being completely waterproof, it is readily protected from any spilling from a water container which would be used by the contained creature.

Figure 2:
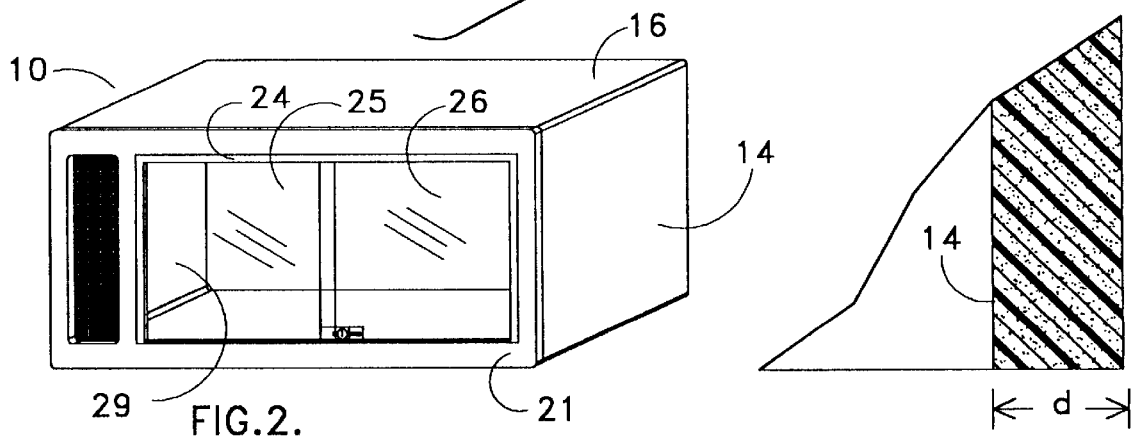
FIG. 2 is a perspective view of the reptile cage of FIG. 1.

The assembled cage is shown in FIG. 2 where it can be appreciated that the inner surface 29 being made from a polymeric plastic shell is easy to clean and maintain in an attractive condition. The cage is, of course, opened by unlocking lock 27 and sliding one of the doors 25 or 26 open and placing the reptile or other creature inside.

Figure 3:
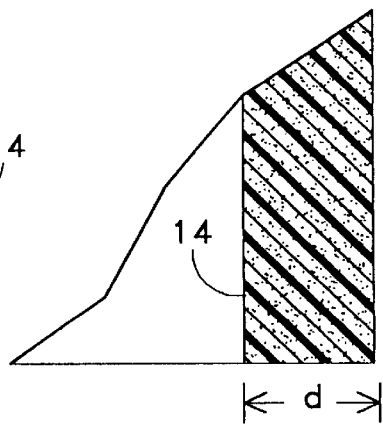
FIG. 3 is an enlarged cross-sectional view taken along line 3—3 of FIG. 1.

The essential feature of the present invention is the foamed polymeric wall which is shown in cross-sectional view in FIG. 3 and its thickness indicated by reference character "d". The polymeric foam should be made with a foam density of between 1 lb. and 5 lbs. per cubic foot and can be made from a very inexpensive foam such as polystyrene. The inner shell can be made from a relatively inexpensive polymer such as high impact polystyrene or ABS, which polymers are capable of being formed by vacuum forming of course, this inner liner can be made by injection molding or blow molding or rotocasting.

It is also possible to maintain the inside of cage 10 at any desirable temperature by placing a low wattage source of heat, such as a light bulb, within the confines of the cage. Since the walls, the top and the bottom are highly insulative, a small source of heat will provide sufficient energy to maintain the interior of the cage at a comfortable temperature. A thermostat may be used in conjunction with the bulb to turn the bulb on and off to maintain the desired temperature.

In the past, wire cages have been commonly used for displaying snakes, but such cages are incapable of being maintained at a temperature other than that of the surroundings. Thus, the ability to provide an enclosure with a highly insulative surface creates the ability to far more accurately control the temperature within the cage. Thus, the cage conserves energy while also permitting the inexpensive maintenance of a desired temperature. The cage is, of course, very light and thus, easy to transport and is inexpensive to fabricate.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A cage for reptiles having at least three side walls, a top and a bottom fabricated from a polymeric foam and wherein the side walls and bottom have a foam thickness of between 1" and 3" and wherein the cage has a front area with no foam and the cage has an inner surface comprising a bottom floor, two side wall surfaces, a back wall and a ceiling and all of said inner surface is covered with a single unitary solid polymeric sheeting and the front area of said cage includes an air permeable portion.

2. The cage for reptiles of claim 1 wherein the polymeric foam is STYROFOAM™.

3. The cage for reptiles of claim 1 further including a front area covering comprising a sliding transparent window and a vent screen.

4. A process for comfortably housing reptiles in captivity, comprising:

placing at least one reptile in a container having a bottom, two sides, a back and a top made of a polymeric foam having a density of between 1 and 5 lbs. per cubic foot and between 1" and 3" thick and said container having an inner surface covered with a single unitary solid polymeric sheeting layer; and closing a front with a cover that is at least partly air permeable.

* * * * *